US008100616B2

(12) United States Patent
Townson et al.

(10) Patent No.: US 8,100,616 B2

(45) Date of Patent: Jan. 24, 2012

(54) CLINCH NUT TO PREVENT CORROSION

(75) Inventors: James M. Townson, Clarkston, MI (US); Kevin T. Dempsey, Macomb, MI (US); Michael J. Cowan, Macomb, MI (US); David C. Vozza, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 501 days.

(21) Appl. No.: 12/270,104

(22) Filed: Nov. 13, 2008

(65) Prior Publication Data

US 2010/0119324 A1 May 13, 2010

(51) Int. Cl.
*F16B 37/04* (2006.01)

(52) U.S. Cl. ........................ 411/180; 411/187; 411/427

(58) Field of Classification Search .................. 411/176, 411/179, 180, 181, 183, 187, 546, 427
See application file for complete search history.

(56) References Cited

U.S. PATENT DOCUMENTS 2,108,975 A * 2/1938 Sorensen ...................... 411/183
3,444,917 A * 5/1969 Bennett .......................... 411/176
4,245,960 A * 1/1981 Matthews ................ 416/244 R
4,690,599 A 9/1987 Shinjo
5,096,350 A * 3/1992 Peterson ......................... 411/12
6,543,855 B2 * 4/2003 Bruck ...................... 297/440.21
6,986,629 B2 * 1/2006 Babej et al. ................... 411/180
7,237,996 B2 * 7/2007 Vrana ........................... 411/180
7,427,180 B2 * 9/2008 Ladoucer et al. ............. 411/181

* cited by examiner

*Primary Examiner* — Flemming Saether

(57) ABSTRACT

A clinch nut is used to attach a first panel and a second panel with a space therebetween for accepting a liquid primer. The body has a nut face for abutting a first panel and a threaded aperture through the nut body for receiving a threaded bolt. The nut face has grooves into which the first panel is deformed to clinch the nut body to the first panel. An abutment rises from the nut face a distance greater than the thickness of the first panel so that upon the bolting of the second panel to the first panel by the insertion of the threaded bolt into the threaded aperture of the nut body, the second panel will be spaced from the first panel by the abutment thereby assuring that the liquid primer can flow between the first and second panels.

12 Claims, 2 Drawing Sheets

12 18 14 24 28 10 26 20 52 42 2 36 64 46 64 64 58 2 64 48 44 30 34 60

CLINCH NUT TO PREVENT CORROSION

FIELD OF THE INVENTION

The present invention relates to a clinch nut for use with a threaded bolt to attach together first and second panels with a space between the panels for accepting a liquid primer to prevent corrosion.

BACKGROUND OF THE INVENTION

It is well known in the auto industry to bolt together two abutting sheet metal panels, thereby forming a complex vehicle body structure or chassis structure. After assembly of the sheet metal panels, via various welding and bolting processes, the entire vehicle body is dipped into a large bath of liquid primer in order to coat all of the exposed metal surfaces and thereby provide protection against corrosion.

In order to improve the flow of the primer into small spaces between adjacent metal panels, the coating process includes electro-deposition of the primer. In electro-deposition, the liquid primer and the vehicle body are oppositely charged so that the primer material is electrically attracted into a consistent and uniform deposit on the surfaces of the vehicle body.

It would be desirable to provide improvements in the construction of bolted together vehicle body panels to further improve the flow of the liquid primer into the small spaces between adjacent body panels. The present invention provides an improved clinch nut for attaching first and second metal panels in a consistent and assured spaced apart relationship to promote the flow of liquid primer between both panels.

SUMMARY OF THE INVENTION

A clinch nut is provided for use with a threaded bolt to attach together a first panel and a second panel with a space between the first and second panels for accepting a liquid primer. The body has a nut face for abutting a first panel and a threaded aperture through the nut body for receiving a threaded bolt extending from the second panel. The nut face has grooves into which the first panel is deformed to clinch the nut body to the first panel. An abutment rises from the nut face a distance greater than the thickness of the first panel so that upon the bolting of the second panel to the first panel by the insertion of the threaded bolt into the threaded aperture of the nut body, the second panel will be spaced from the first panel by the abutment thereby assuring that the liquid primer can flow between the first and second panels. The abutment can be a plurality of dimples rising from the nut face, or a pair of ridges that rise from the nut face.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
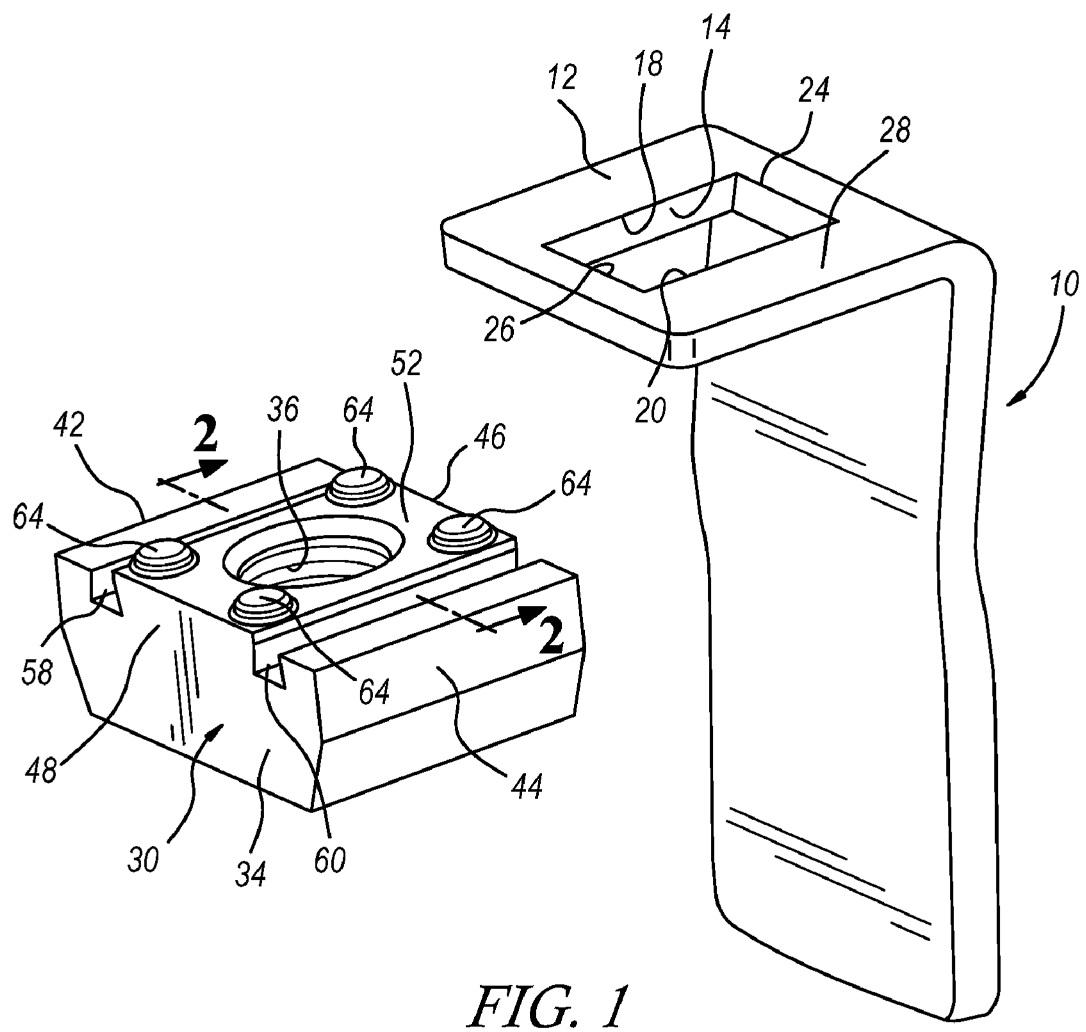
FIG. 1 is a perspective view showing a first metal panel and a clinch nut according to the invention.

Referring to FIG. 1, a first sheet metal panel indicated at 10 is an L-shaped bracket having a flange 12 with a rectangular slot 14 formed therein. The rectangular slot 14 is defined by opposed side edge walls 18 and 20 and opposed end walls 24 and 26. The flange 12 also has a top surface 28.

FIG. 1 also shows a clinch nut, generally indicated at 30 which will be clinched to the first metal panel 10 as will be discussed hereinafter. Clinch nut 30 includes a metallic nut body 34 of generally rectangular shape having a central threaded aperture 36 in the center thereof. The nut body 34 has side facewalls 42 and 44 and end walls 46 and 48. Nut body 34 has a nut face 52 through which the threaded aperture 36 extends and which will face toward the flange 12 of the first metal panel 10.

As seen in FIG. 1, the nut face 52 has a pair of spaced apart grooves 58 and 60 provided therein. The groove 58 is located between side face wall 42 of the nut body 34 and the threaded aperture 36. The groove 60 is located between the side face wall 44 of the nut body 34 and the threaded aperture 36. A plurality of abutments 64 rise from the nut face 52 by a distance that is greater than the thickness of the sheet metal thickness of the flange 12 of the sheet metal panel 10. As seen in FIG. 1, the abutments 64 are individual dimples and are located between the grooves 58 and 60 and the threaded aperture 36.

Figure 2:
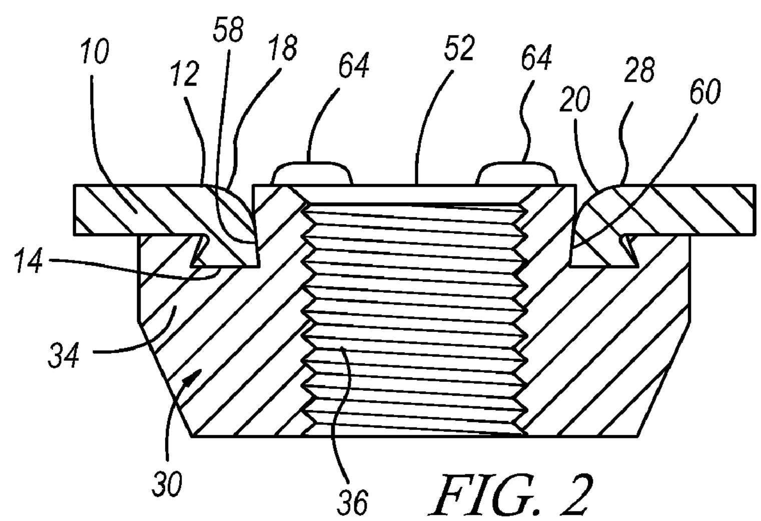
FIG. 2 is a section through the clinch nut and showing the clinch nut having been clinched to the first metal panel.

Referring to FIG. 2 the nut 30 is shown after having been attached to the first sheet metal panel 10 in a sheet metal clinching operation. As seen in FIG. 2, the side edge wall 18 of the slot 14 has been deformed downwardly into the groove 58 of the nut face 52. Likewise, the side edge wall 20 of slot 14 has been deformed downwardly into the groove 60 of the nut face 52. The clinching operation is conventionally known and accomplished in a tool where an upper die strikes the flange 12 to deform the side edge walls 18 and 20 downwardly into the groove 60 to the position of FIG. 2. In this manner, the clinch nut 30 is permanently attached to the flange 12.

As best seen in FIG. 2, the abutments 64 rising from the nut face 52 have a height dimension which is greater than the thickness of the flange 12 of sheet metal panel 10. In addition, as seen in FIG. 2, because the abutments 64 are located between the grooves 58 and 60, the abutments reach upwardly to extend through the slot 14 between the downwardly deformed side edge walls of the slot 14. Accordingly, as seen in FIG. 2 the top of the abutments 64 project above the top surface 28 of the flange 20.

Figure 3:
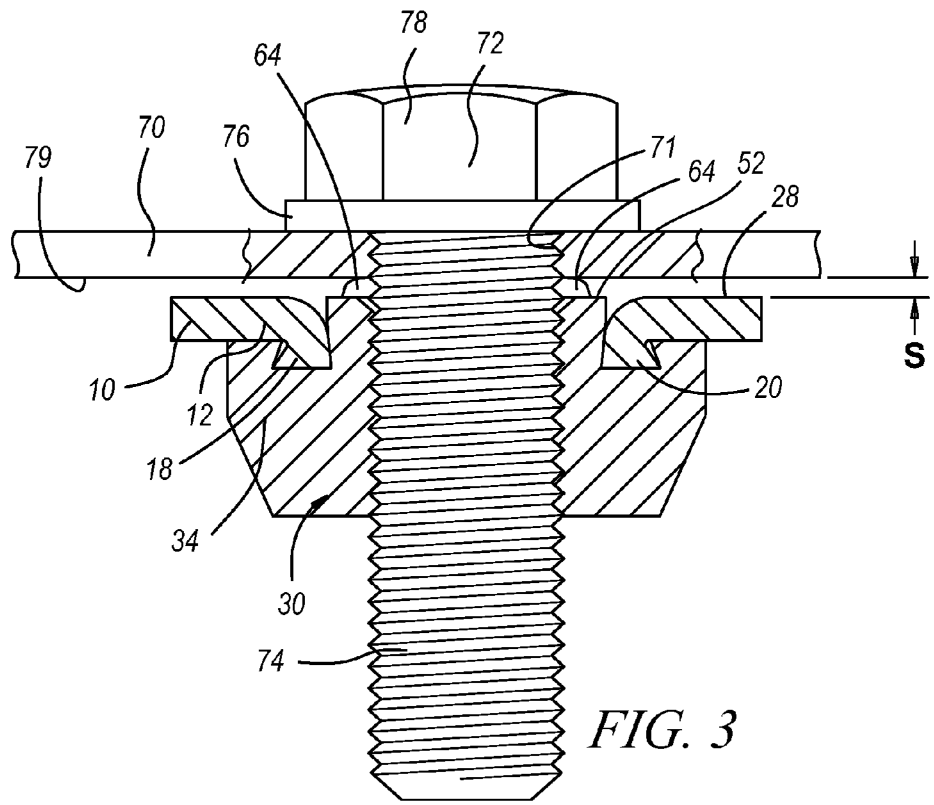
FIG. 3 is a view similar to FIG. 2 but showing a bolt extending through a second metal panel and threaded into the clinch nut of FIG. 2 to attach the second metal panel to the first metal panel.

Referring now to FIG. 3 it is seen that a second sheet metal panel 70 has been positioned against the first sheet metal panel 10. The second sheet metal panel 70 has a bolt hole 71. A threaded bolt 72 has been inserted through the bolt hole 71 and threaded into the threaded aperture 36 of the clinch nut 30. In particular, the bolt 72 includes a threaded shank 74, a washer 76, and a hex head 78. As seen in FIG. 3, an under face 79 of the second sheet metal panel 70 is held at a slight distance from the top surface 28 of the flange 12 of the first sheet metal panel 10 by the presence of the plurality of abutments 64. Thus, the height of the abutments 64 are effective to provide an ensured spacing "S" between the first panel 10 and the second panel 70 so that, during subsequent immersion of the vehicle body into a bath of primer, the primer is able to flow between the first panel 10 and second panel 70 and thereby accomplish assured coating of the metal surfaces without the occurrence of any uncoated regions between panels.

Figure 4:
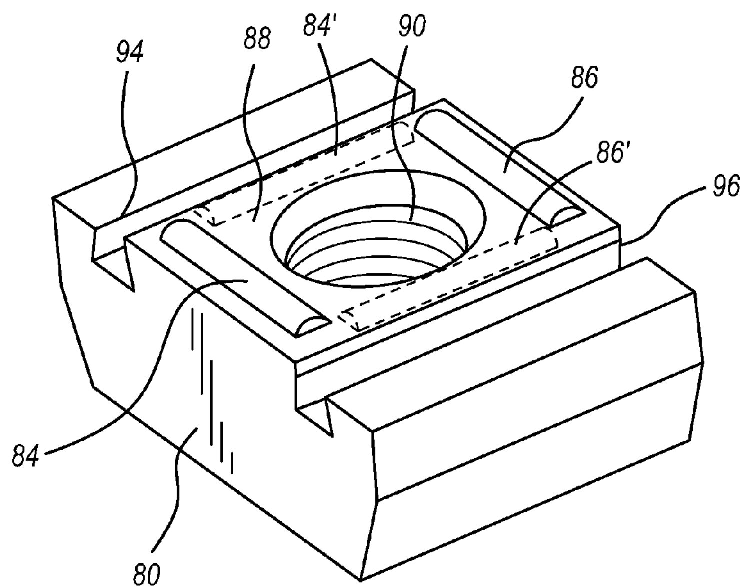
FIG. 4 is a perspective view of a second embodiment of the clinch nut.

Referring to FIG. 4 another embodiment of the invention is shown in which a clinch nut 80 is provided that is constructed similar to the embodiment of FIG. 1 with the exception that a pair of ridges 84 and 86 rise from the face 88 of the clinch nut 80 to provide the abutments for spacing apart the first and second panels. In particular, as shown in FIG. 4 the ridges 84 and 86 are located on opposite sides of the threaded aperture 90. Furthermore, the ridges 84 and 86 extend perpendicular to the spaced apart grooves 94 and 96.

It will be understood that the ridges 84 and 86 of FIG. 4 could alternatively extend in the direction parallel to the grooves 94 and 96, as shown by ridges 84' and 86'. p The foregoing specific examples are intended to indicate exemplary embodiments and not to limit the scope of the invention. It will be appreciated that the abutments formed on the nut face can have shapes that are different from the specific examples given herein. For example, in FIG. 1 the invention is not limited to use of four uniformly spaced apart abutments, but rather any plurality of abutments may be provided to achieve the desired goal of spacing apart the panels. Furthermore, in the example of FIG. 4 where the abutment is provided by ridges, the ridges can be of any shape, such as curved or L-shaped or otherwise arranged upon the face of the nut body to provide an assured spacing for the flow of primer into the space between the panels. Although FIGS. 1-4 show the example of a clinch nut 30 that is rectangular in shape, it will be understood that the nut can alternatively be of round or hexagonal or other shape. In addition, in FIG. 1 the first sheet metal panel 10 includes rectangular slot 14 formed therein prior to the clinching of the clinch nut. However, it will be understood that the clinch nut 30 can be pierced through the first sheet metal panel in the same operation and in the same die set in which the first sheet metal panel is clinched into the grooves of the clinch nut 30, thus eliminating the need to punch the slot 14 into the first sheet metal panel 10.

What is claimed is:

1. A clinch nut for use with a threaded bolt to attach together a first panel and second panel with a space between the first and second panels for accepting a liquid primer comprising:

a nut body having a nut face and a threaded aperture through the nut body for receiving the threaded bolt extending from the second panel, said nut face having grooves into which the first panel is deformed to clinch the nut body to the first panel, and a plurality of discrete abutments rising from the nut face by a height so that upon the bolting of the second panel to the first panel by the insertion of the threaded bolt into the threaded aperture of the nut body the second panel will be spaced from the first panel by the plurality of discrete abutments whereby a liquid primer can flow between the first and second panels.

2. The clinch nut of claim 1 further comprising the plurality of discrete abutments rising from the nut face being a plurality of individual dimples.

3. The clinch nut of claim 1 further comprising the a plurality of discrete abutments rising from the nut face being located between the grooves of the nut face and the threaded aperture.

4. The clinch nut of claim 1 further comprising the plurality of discrete abutments being a pair of ridges that rise from the nut face on opposite sides of the threaded aperture.

5. The clinch nut of claim 4 further comprising the ridges extending parallel with the grooves.

6. The clinch nut of claim 4 further comprising the ridges extending perpendicular to the grooves.

7. A bolted together panel assembly comprising:

a first panel having a slot therein defined by edge walls of the first panel and having a top surface;

a second panel having a bolt receiving aperture therein and an under face;

a bolt;

a nut body having a nut face and a threaded bolt-receiving aperture therein, said nut face having grooves into which the edge walls of the slot of the first panel are deformed to clinch the nut body to the first panel, said nut body having a plurality of abutments rising from the nut face and said plurality of abutments having a height to project above the first panel so that upon the bolting of the second panel to the first panel by the insertion of the threaded bolt into the threaded aperture of the nut body the second panel will be spaced from the first panel by the plurality of abutments whereby a liquid primer can flow between the first and second panels.

8. The bolted together panel assembly of claim 7 further comprising the plurality of abutments being a plurality of discrete abutments rising from the nut face and being a plurality of individual dimples.

9. The bolted together panel assembly of claim 7 further comprising the plurality of abutments being a plurality of discrete abutments rising from the nut face and located between the grooves of the nut face and the threaded aperture.

10. The bolted together panel assembly of claim 7 further comprising the plurality of abutments being a pair of ridges that arise from the nut face on opposite sides of the threaded aperture.

11. The bolted together panel assembly of claim 10 further comprising the ridges extending parallel with the grooves.

12. The bolted together panel assembly of claim 10 further comprising the ridges extending perpendicular to the grooves.

* * * * *